(12) United States Patent
Jang et al.

(10) Patent No.: US 9,283,417 B2
(45) Date of Patent: Mar. 15, 2016

(54) METHOD OF DETOXIFYING ASBESTOS BY USING ROOM-TEMPERATURE RECRYSTALLIZATION SCHEME

(71) Applicant: KOREA INSTITUTE OF GEOSCIENCE AND MINERAL RESOURCES, Daejeon (KR)

(72) Inventors: Young-Nam Jang, Daejeon (KR); Soo-Chun Chae, Seoul (KR); Myung-Kyu Lee, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 0 days.

(21) Appl. No.: 14/555,266

(22) Filed: Nov. 26, 2014

(65) Prior Publication Data
US 2015/0148583 A1    May 28, 2015

(30) Foreign Application Priority Data

Nov. 27, 2013 (KR) ........................ 10-2013-0145597

(51) Int. Cl.
| | | |
|---|---|---|
| *A62D 3/34* | (2007.01) |
| *A62D 3/36* | (2007.01) |
| *B09B 3/00* | (2006.01) |
| *A62D 101/41* | (2007.01) |

(52) U.S. Cl.
CPC ................ *A62D 3/36* (2013.01); *B09B 3/0066* (2013.01); *A62D 2101/41* (2013.01)

(58) Field of Classification Search
CPC ....................................................... A62D 3/34
USPC .................................................. 588/318, 411
See application file for complete search history.

(56) References Cited

FOREIGN PATENT DOCUMENTS

| JP | 3066976 B2 | 7/2000 |
|---|---|---|
| KR | 10-2006-0110119 A | 10/2006 |
| KR | 10-2009-0083541 A | 8/2009 |
| KR | 10-2012-0024103 A | 3/2012 |
| KR | 10-2012-0110425 | 10/2012 |
| WO | WO 90/15642 A1 | 12/1990 |

OTHER PUBLICATIONS

Korean Office action with English Translation for Patent Application No. 10-2013-0145597, dated Nov. 27, 2014, 12 pages.
Korean Notice of Allowance with English Translation for Application No. 10-2013-0145597, dated Jun. 29, 2015, 4 pages.

*Primary Examiner* — Edward Johnson
(74) *Attorney, Agent, or Firm* — Lewis Roca Rothgerber Christie LLP

(57) ABSTRACT

Disclosed is a method of detoxifying asbestos by using a room-temperature recrystallization scheme. The method includes heat-treating a rock or slate containing asbestos; and putting the heat-treated rock or slate in an aqueous solution, to which organic acid is added, to allow the heat-treated rock or slate to react with the aqueous solution having the organic acid.

14 Claims, 3 Drawing Sheets

METHOD OF DETOXIFYING ASBESTOS BY USING ROOM-TEMPERATURE RECRYSTALLIZATION SCHEME

CROSS-REFERENCE TO RELATED APPLICATION

This application claims priority to Korean Patent Application No. 10-2013-0145597 filed on Nov. 27, 2013, and all the benefits accruing therefrom under 35 U.S.C. §119, the contents of which is incorporated by reference in its entirety.

BACKGROUND OF THE INVENTION

1) Field of the invention The present invention relates to a method of detoxifying asbestos by using a room-temperature recrystallization scheme.

2) Background of Related Art

Asbestos is one of industrial source minerals utilized in industrial fields, and called by a product name or an ore name. The asbestos is a general product name, and serpentine, olivine or a mineral name is used as the ore name.

The industrial use of asbestos has been recorded since the early $19^{th}$ century, and it has been known that the asbestos has been regularly mined in Canada, Italy, and the Soviet Union in the end of $19^{th}$ century. In the early $20^{th}$ century, the beginning of the use of the asbestos in a brake lining, a clutch, and a gasket of a vehicle rapidly increases the demand for the asbestos. The Second World War diversifies the use of the asbestos, so that millions tons of asbestoses are used to develop North America and reconstruct Europe. Even in Korea, all thatched roofs in farming areas are replaced with slate roofs as a part of Saemaeul movement.

Meanwhile, asbestos minerals are produced in the form of a fibrous assembly, that is, in the form of a bundle. In addition, the asbestos minerals are easily separated from a peripheral dry rock, and split into smaller pieces along a cleavage surface. The fibers represent high tensile force, and have a long length to the extent that the ratio of the minor axis to the major axis is in the range of 20 to 1000. When viewed by using naked eyes of a user, the fibers have the characteristics the same as that of organic fiber such as cellulose, and have flexibility to the extent that thread can be made. Meanwhile, all asbestos minerals are not harmful, and only the asbestos minerals having the fibrous structure are harmful. If a user inhales asbestos dust through a respiratory organ, health problems may be caused. However, even if the user inhales asbestos dust, a disease is not caused unconditionally. It is known that asbestos dust having the length of 5 μm or more, the diameter of 2 μm or less, and the aspect ratio of 5:1 or more is mainly attached to the fine structure of the lung to cause a disease. Although lung cancer appears to a user having a job causing the inhalation of a great amount of asbestos dust or inhaling the asbestos dust for a long time, the disease appears after 20 to 40 years since the user inhales the asbestos dust. Diseases caused by the asbestos include pulmonary asbestosis, lung cancer, celothelioma, and pleural thickening.

Since the asbestos is harmful in an environmental aspect as described above, the asbestos must be safely treated when the asbestos is wasted. Recently, even though most asbestos are buried in a proper place, the burial of the asbestos without the pre-treatment is restricted. Accordingly, since a pre-treatment process is indispensable so that the whole processes are complicated, high cost is increased, and an environmental pollution material after the burial of the asbestos is exposed, a technology of scientifically and safely treating the asbestoses at low cost is required. Especially, Korea designates all acts such as handling and moving of all materials including 1% or more of asbestos as illegal acts in 2011.

Among schemes of treating the asbestos developed until now, there are chemical treatment schemes including a scheme of removing the fibrous structure of the asbestos by treating the surface of the asbestos, and a scheme of melting the asbestos by heating the asbestos at a high temperature. According to the schemes, a bigger problem may be caused by a used solution rather than the harmfulness of the asbestos. In addition, energy may be significantly required, and the treatment cost is greatly required due to the high-temperature heating process.

As a related art of the present invention, there is Korea Unexamined Patent Publication No. 10-2012-0110425 entitled "method of asbestos detoxification and calcium compound reaction liquid used therefore" published on Oct. 10, 2012.

SUMMARY OF THE INVENTION

Accordingly, an object of the present invention is to provide a method of detoxifying asbestos or slate including the asbestos by using a room-temperature recrystallization scheme.

The objects of the present invention are not limited to the above-mentioned objects, and other objects will be clearly understood from the following description by those skilled in the art.

To achieve the above objects, according to the present invention, there is provided a method of detoxifying asbestos by using a room-temperature recrystallization scheme, which includes heat-treating a rock or slate containing asbestos; and putting the heat-treated rock or slate in an aqueous solution, to which organic acid is added, to allow the heat-treated rock or slate to react with the aqueous solution having the organic acid.

According to the present invention, there is provided a method of detoxifying asbestos by using a room-temperature recrystallization scheme, which includes heat-treating a rock or slate containing asbestos; and putting the heat-treated rock or slate in aqueous solution, to which organic acid is added, to allow the heat-treated rock or slate to react with the aqueous solution having the organic acid, wherein the organic acid is added to the aqueous solution at a weight ratio of 0.0125 to 0.06 with respect to the rock or the slate containing asbestos.

The rock containing asbestos may include serpentine, and the organic acid may be oxalic acid ($C_2H_4O_2 \cdot 2H_2O$).

The heat treatment is performed at a temperature in a range of 500° C. to 600° C.

The reaction of the rock or slate containing the heat-treated asbestos with the organic acid is performed at a room temperature and a normal pressure.

The reaction is performed for 6 hours to 12 hours.

According to the present invention, the fibrous structure of asbestos in the rock or slate containing asbestos is dissolved to recrystallize the asbestos in a rhombohedral shape, so that the asbestos may be detoxified.

In view of environment protection that prohibits the use of a material containing the asbestos of 1% or more, the method of detoxifying asbestos according to the present invention may not produce by-products. In addition, since the organic acid is subject to the reaction at the room temperature, the process is simple, safe and pollution-free.

DETAILED DESCRIPTION OF THE INVENTION

Hereinafter, an example embodiment of the present invention will be described in detail with reference to accompanying drawings.

The advantages, the features, and schemes of achieving the advantages and features of the present invention will be apparently comprehended by those skilled in the art based on the embodiments, which are detailed later in detail, together with accompanying drawings.

The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims.

In addition, the details of the generally-known technology that makes the subject matter of the present invention unclear will be omitted in the following description.

According to the present invention, there is provided a method of detoxifying asbestos by using a room-temperature recrystallization scheme, which includes the steps of: heat-treating a rock or slate containing asbestos; and putting the heat-treated rock or slate in aqueous solution, to which organic acid is added, to allow the heat-treated rock or slate to react with the aqueous solution having the organic acid.

Different from methods of treating asbestos according to the related art, which bury the asbestos at a suitable place after the asbestos is enveloped in a polyethylene vessel, causes deformation due to a carbonating process or uses strong acid, resulting in high costs and exposure of environmental pollution materials, the present invention performs the heat treatment and organic acid treatment so that a large quantity of asbestos may be processed safely at a low cost in an environment-friendly manner.

Figure 1:
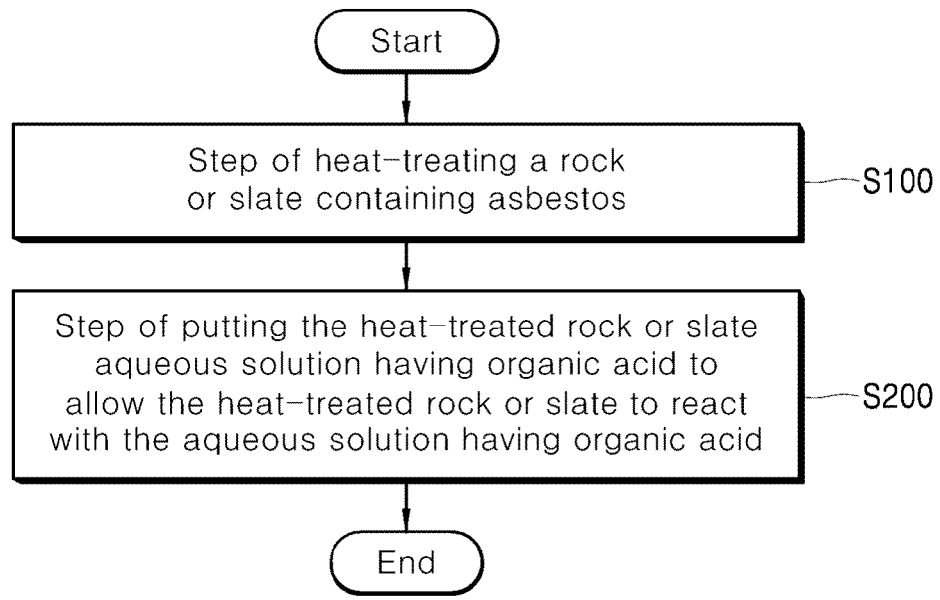
FIG. 1 is a flowchart illustrating a method of detoxifying asbestos by using a room-temperature recrystallization scheme according to an embodiment of the present invention.

FIG. 1 is a flowchart illustrating a method of detoxifying asbestos by using a room-temperature recrystallization scheme according to an embodiment of the present invention. Hereinafter, the present invention will be described in detail with reference to FIG. 1

The method of detoxifying asbestos by using a room-temperature recrystallization scheme according to the present invention includes step S100 of heat-treating a rock or slate containing asbestos.

In the method of detoxifying asbestos by using a room-temperature recrystallization scheme according to the present invention, the rock containing asbestos may include serpentine, and the method may be applied to construction wastes such as slate containing the asbestos of about 15%. In case of slate, after the slate is pulverized through wet agitation and the pulverized slate is divided into cement paste and white asbestos through a flotation scheme, only the white asbestos is treated. Differently, the suitable size of pulverized slate may be treated. To the contrary, a slate plate may be treated without pulverizing of the slate plate. In addition, the present invention is applicable to the treatment of other asbestos products, for example, clothes made of asbestos or a products having high-concentration asbestos such as a liner in a steel mill.

In this case, the heat treatment is preferably performed at temperature in the range of 500° C. to 600° C. When the rock or slate containing asbestos is heat-treated, the rock or slate containing asbestos is in an anhydride state, so that the reactivity of asbestos is greatly increased. When the rock or slate containing asbestos is serpentine, as expressed as following reaction formula 1, the serpentine becomes anhydride serpentine through the heat-treatment. When the temperature of the heat treatment is less than 500° C., crystal water in the rock or slate containing asbestos is not perfectly removed, so that the reactivity of the rock or slate containing asbestos with organic acid at room temperature is decreased. When the temperature of the heat treatment exceeds 600° C., since the dehydration reaction is not shown in the rock or slate containing asbestos anymore, the temperature of 600° C. or less is preferable in view of energy efficiency.

[Reaction formula 1]

In addition, it is preferable to perform the heat treatment for 5 to 15 hours. When the time of the heat treatment is less than 5 hours, crystal water in the rock or slate containing asbestos is not perfectly removed, so that the reactivity of the rock or slate containing asbestos with organic acid is deteriorated. When the time of the heat treatment exceeds 15 hours, since the dehydration reaction is not shown in the rock or slate containing asbestos anymore, it is preferable in view of energy efficiency to perform the heat treatment for less than 15 hours.

The method of detoxifying asbestos by using a room-temperature recrystallization scheme according to the present invention includes step S200 of putting the heat-treated rock or slate in the aqueous solution having organic acid to allow the heat-treated rock or slate to react with the aqueous solution having organic acid.

In this case, the reaction of the heat-treated rock or slate may be performed at room temperature (25° C.) and under normal pressure, and may be preferably performed for 6 to 12 hours. Since the oxalic acid has high reactivity and a low melting point, the oxalic acid may change fibrous asbestos into rhombohedron by 99% through the chelation reaction at room temperature and under normal pressure. As expressed as following reaction formula 2, the asbestos contained in the rock or slate reacts with the oxalic acid to generate a silicon dioxide and water while the magnesium oxalate is formed. Thus, the shape of the fibrous asbestos is fully changed into a hexahedron shape or an amorphous state. When the reaction is performed for less than 6 hours, the chelation reaction is not sufficiently performed, so that the asbestos may not be detoxified. When the reaction time exceeds 12 hours, the chelation reaction is fully fulfilled, so that the detoxification of asbestos does not occur anymore. Thus, it is preferable to perform the reaction time for 12 hours or less.

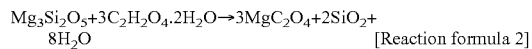
[Reaction formula 2]

In addition, according to the present invention, there is provided a method of detoxifying asbestos by using a room-temperature recrystallization scheme, which includes the steps of: heat-treating a rock or slate containing asbestos; and putting the heat-treated rock or slate in aqueous solution, to which organic acid is added, to allow the heat-treated rock or slate to react with the organic acid added aqueous solution, wherein the organic acid is added to the aqueous solution at a weight ratio of 0.0125 to 0.06 with respect to the rock or slate containing asbestos.

According to the method of detoxifying asbestos by using a room-temperature recrystallization scheme of the present invention, the organic acid is included at a weight ratio of 0.0125 to 0.06 with respect to the rock or slate containing asbestos, so that the asbestos may be detoxified with a very small amount of organic acid. When the weight ratio of the organic acid to the rock or slate containing asbestos is less than 0.0125, the asbestos contained in the rock or slate may not be removed by 99% or more. When the weight ratio of the organic acid to the rock or slate containing asbestos exceeds 0.0125, unreacted organic acid may be residual.

Embodiment 1

Detoxification of Slate 1

After the slate plate of 100×500 mm and 400 g was put in an electric furnace and heated at 500° C. for 10 hours, the heated slate plate was cooled. Then, after the heat-treated slate plate was put in the aqueous solution obtained by adding the oxalic acid ($C_2H_4O_2.2H_2O$) of 5 g to the distilled water of 500 cc, the slate plate was maintained in the aqueous solution at the room temperature for about 10 hours.

Figure 2:
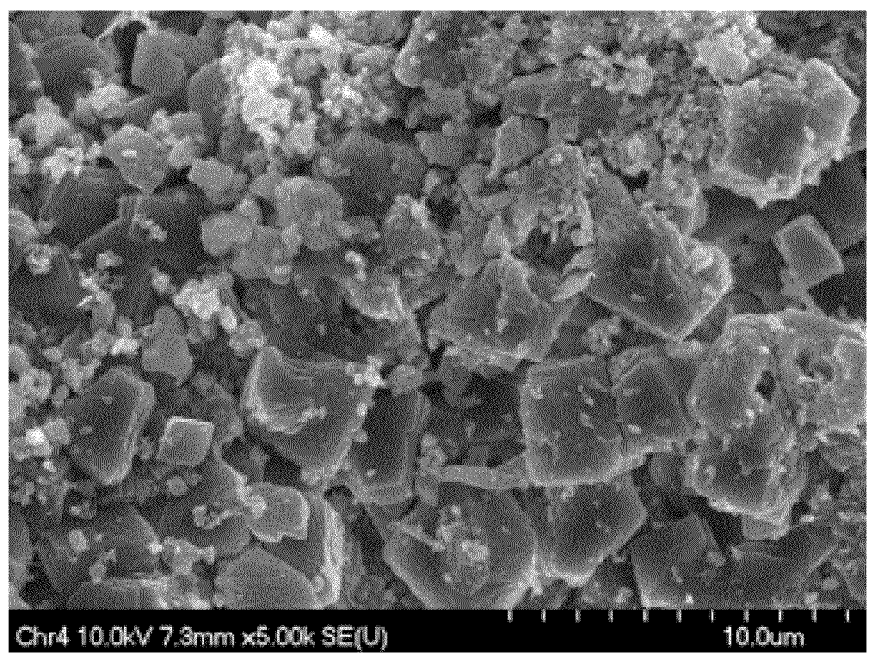
FIG. 2 of (a) is an SEM photograph of slate and FIG. 2 of (b) is an X-ray diffraction result of slate after a process of detoxifying asbestos according to embodiment 1 of the present invention.
Figure 2:
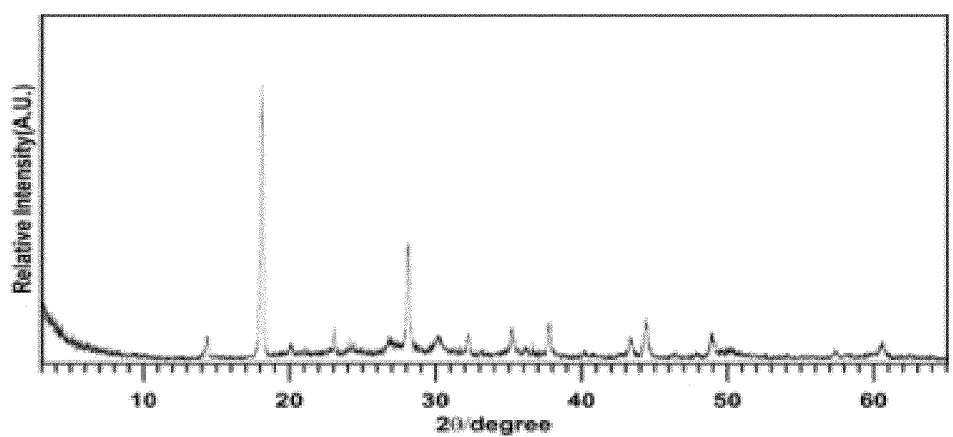

After the reaction was completed, as the result of observing the slate surface by using a scanning electron microscope (SEM), any asbestos was not observed on the slate surface (see (a) of FIG. 2). In addition, even in an X-ray diffraction analysis result, any evidence of white asbestos peak was not found at 2θ value=12 degrees, so that it was confirmed that all asbestos existing on the slate surface was changed into magnesium oxalate and calcium oxalate (see (b) of FIG. 2).

Embodiment 2

Detoxification of Slate 2

The slate was detoxified in the same scheme as that of embodiment 1 except that the heat treatment was performed at the temperature of 600° C.

After the reaction was completed, as the result of observing the slate surface by using SEM, any asbestos was not observed on the slate surface. In addition, even in an X-ray diffraction analysis result, any evidence of white asbestos peak was not found.

Embodiment 3

Detoxification of Slate 3

The slate was detoxified in the same scheme as that of embodiment 1 except that the heat treatment was performed for 5 hours.

After the reaction was completed, as the result of observing the slate surface by using SEM, any asbestos was not observed on the slate surface. In addition, even in an X-ray diffraction analysis result, any evidence of white asbestos peak was not found.

Embodiment 4

Detoxification of Slate 4

The slate was detoxified in the same scheme as that of embodiment 1 except for the fact that the heat treatment was performed for 15 hours.

After the reaction was completed, as the result of observing the slate surface by using SEM, any asbestos was not observed on the slate surface. In addition, even in an X-ray diffraction analysis result, any evidence of white asbestos peak was not found.

Embodiment 5

Detoxification of Slate 5

The slate was detoxified in the same scheme as that of embodiment 1 except that the reaction with oxalic acid was performed for 6 hours.

After the reaction was completed, as the result of observing the slate surface by using SEM, any asbestos was not observed on the slate surface. In addition, even in an X-ray diffraction analysis result, any evidence of white asbestos peak was not found.

Embodiment 6

Detoxification of Slate 6

The slate was detoxified in the same scheme as that of embodiment 1 except for the fact that the reaction with oxalic acid was performed for 12 hours.

After the reaction was completed, as the result of observing the slate surface by using SEM, any asbestos was not observed on the slate surface. In addition, even in an X-ray diffraction analysis result, any evidence of white asbestos peak was not found.

Comparative Example 1

Slate Treatment 1

The slate plate of 100×500 mm and 400 g was put in the aqueous solution obtained by adding the oxalic acid of 5 g to the distilled water of 500 cc without any heat treatment process and then the slate plate was maintained in the aqueous solution at the room temperature for about 120 hours.

Figure 3:
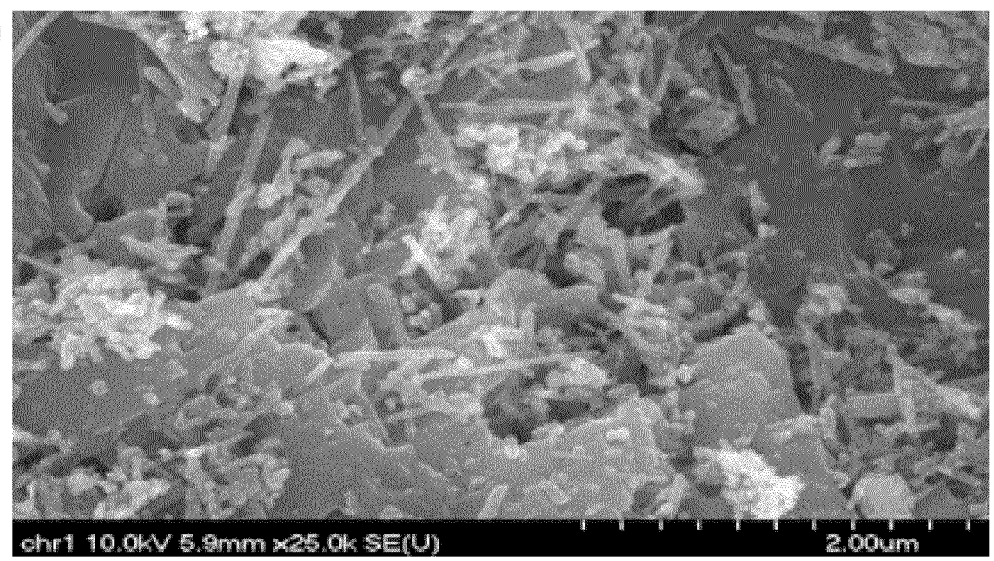
FIG. 3 of (a) is an SEM photograph of slate and FIG. 3 of (b) is an X-ray diffraction result of slate after treating the slate in comparative example 1.
Figure 3:
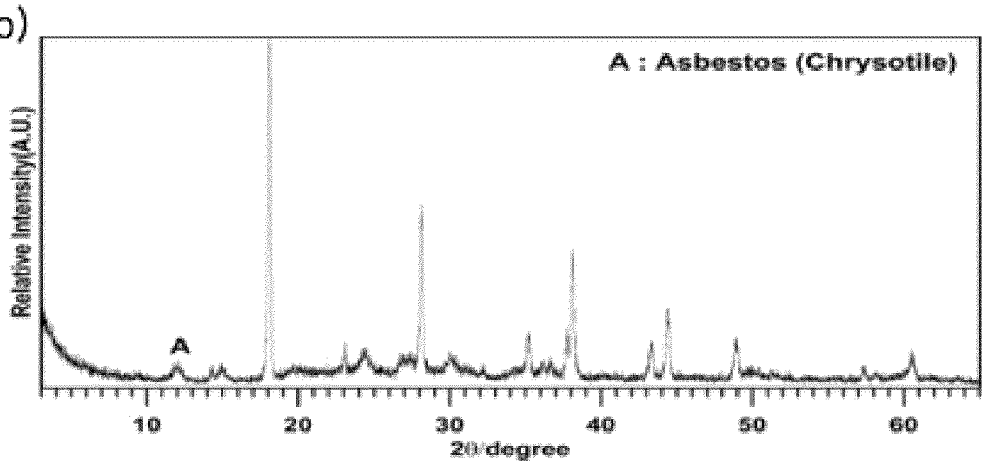

After the reaction was completed, as the result of observing the slate surface by using SEM, a great quantity of asbestos was found on the slate surface (see (a) of FIG. 3). In addition, as an X-ray diffraction analysis result, evidence of white asbestos peak was found at 2θ value=12 degrees. Thus, it was confirmed that the asbestos was rarely detoxified (see (b) of FIG. 3).

Comparative Example 2

Slate Treatment 2

After the slate plate of 100×500 mm and 400 g was put in an electric furnace and heated at 400° C. for 10 hours, the heated slate plate was cooled. Then, after the heat-treated slate plate was put in the aqueous solution obtained by adding the oxalic acid of 5 g to the distilled water of 500 cc, the slate plate was maintained in the aqueous solution at room temperature for about 10 hours.

After the reaction was completed, as the result of observing the slate surface by using SEM, white asbestos was found on the slate surface. In addition, as an X-ray diffraction analysis result, evidence of white asbestos peak was found at 2θ value=12 degrees. Thus, it was confirmed that the asbestos was not detoxified.

Comparative Example 3

Slate Treatment 3

After the slate plate of 100×500 mm and 400 g was put in an electric furnace and heated at 500° C. for 10 hours, the heated slate plate was cooled. Then, after the heat-treated slate plate was put in the aqueous solution obtained by adding the oxalic acid of 5 g to the distilled water of 500 cc, the slate plate was maintained in the aqueous solution at room temperature for about 5 hours.

After the reaction was completed, as the result of observing the slate surface by using SEM, white asbestos was observed on the slate surface. However, as an X-ray diffraction analysis result, a white asbestos peak was not found at 2θ value=12 degrees.

Embodiment 7

Detoxification of Serpentine 1

After the serpentine of 20×50 mm and 50 g including white asbestos was put in an electric furnace and heated at 500° C. for 10 hours, the heated serpentine was cooled. Then, after the heat-treated serpentine was put in the aqueous solution obtained by adding the oxalic acid of 3 g to the distilled water of 300 cc, the slate plate was maintained in the aqueous solution at room temperature for about 10 hours.

After the reaction was completed, as the result of observing the serpentine surface by using SEM, any white asbestos was not observed on the serpentine surface. In addition, even in an X-ray diffraction analysis result, any evidence of white asbestos peak was not found at 2θ value=12 degrees. Thus, it was confirmed that all asbestos existing on the serpentine surface was changed into magnesium oxalate.

Embodiment 8

Detoxification of Serpentine 2

The serpentine was detoxified in the same scheme as that of embodiment 7 except for the fact that the heat treatment was performed at the temperature of 600° C.

After the reaction was completed, as the result of observing the serpentine surface by using SEM, any white asbestos was not observed on the serpentine surface. In addition, even in an X-ray diffraction analysis result, any evidence of white asbestos peak was not found at 2θ value=12 degrees.

Embodiment 9

Detoxification of Serpentine 3

The slate was detoxified in the same scheme as that of embodiment 7 except for the fact that the heat treatment was performed for 5 hours.

After the reaction was completed, as the result of observing the serpentine surface by using SEM, any white asbestos was not observed on the serpentine surface. In addition, even in an X-ray diffraction analysis result, any evidence of white asbestos peak was not found at 2θ value=12 degrees.

Embodiment 10

Detoxification of Serpentine 4

The slate was detoxified in the same scheme as that of embodiment 7 except for the fact that the heat treatment was performed for 15 hours.

After the reaction was completed, as the result of observing the serpentine surface by using SEM, any white asbestos was not observed on the serpentine surface. In addition, even in an X-ray diffraction analysis result, any evidence of white asbestos peak was not found at 2θ value=12 degrees.

Embodiment 11

Detoxification of Serpentine 5

The slate was detoxified in the same scheme as that of embodiment 7 except for the fact that the reaction with the oxalic acid was performed for 6 hours.

After the reaction was completed, as the result of observing the serpentine surface by using SEM, any white asbestos was not observed on the serpentine surface. In addition, even in an X-ray diffraction analysis result, any evidence of white asbestos peak was not found at 2θ value=12 degrees.

Embodiment 12

Detoxification of Serpentine 6

The slate was detoxified in the same scheme as that of embodiment 7 except for the fact that the reaction with oxalic acid was performed for 12 hours.

After the reaction was completed, as the result of observing the serpentine surface by using SEM, any white asbestos was not observed on the serpentine surface. In addition, even in an X-ray diffraction analysis result, any evidence of white asbestos peak was not found at 2θ value=12 degrees.

Comparative Example 4

Serpentine Treatment 1

After the serpentine of 20×50 mm and 50 g including white asbestos was put in an electric furnace and heated at 400° C. for 10 hours, the heated serpentine was cooled. Then, after the heat-treated serpentine was put in the aqueous solution obtained by adding the oxalic acid of 3 g to the distilled water of 300 cc, the serpentine was maintained in the aqueous solution at room temperature for about 10 hours.

After the reaction was completed, as the result of observing the serpentine surface by using SEM, white asbestos was observed on the serpentine surface.

Comparative Example 5

Serpentine Treatment 2

After the serpentine of 20×50 mm and 50 g, a portion of which includes white asbestos, was put in an electric furnace and heated at 500° C. for 10 hours, the heated serpentine was cooled. Then, after the heat-treated serpentine was put in the aqueous solution obtained by adding the oxalic acid of 3 g to the distilled water of 300 cc, the serpentine was maintained in the aqueous solution at room temperature for about 5 hours.

After the reaction was completed, as the result of observing the serpentine surface by using SEM, evidence of white asbestos was observed on the serpentine surface.

The follow table 1 shows the reaction conditions of embodiments 1 to 12 and comparative examples 1 to 5.

TABLE 1

| Example | Sample (g) | Oxalic acid (g) | Weight ratio | Temperature for heat treatment/Time (° C./hours) | Reaction time (hours) | Asbestos existence or not (X-ray) | Asbestos existence or not (SEM) | Removal rate (%) |
|---|---|---|---|---|---|---|---|---|
| Embodiment 1 | 400 | 5 | 0.0125 | 500/10 | 10 | Not | Not | >99 |
| Embodiment 2 | 400 | 5 | 0.0125 | 600/10 | 10 | Not | Not | >99 |
| Embodiment 3 | 400 | 5 | 0.0125 | 500/5 | 10 | Not | Not | >99 |
| Embodiment 4 | 400 | 5 | 0.0125 | 500/15 | 10 | Not | Not | >99 |
| Embodiment 5 | 400 | 5 | 0.0125 | 500/10 | 6 | Not | Not | >99 |
| Embodiment 6 | 400 | 5 | 0.0125 | 500/10 | 12 | Not | Not | >99 |
| Comparative example 1 | 400 | 5 | 0.0125 | — | 120 | Existence | Existence | 0 |
| Comparative example 2 | 400 | 5 | 0.0125 | 400/10 | 10 | Existence | Existence | 0 |
| Comparative example 3 | 400 | 5 | 0.0125 | 500/10 | 5 | Existence | Existence | 60-80 |
| Comparative example 7 | 50 | 3 | 0.06 | 500/10 | 10 | Not | Not | >99 |
| Comparative example 8 | 50 | 3 | 0.06 | 600/10 | 10 | Not | Not | >99 |
| Comparative example 9 | 50 | 3 | 0.06 | 500/5 | 10 | Not | Not | >99 |
| Comparative example 10 | 50 | 3 | 0.06 | 500/15 | 10 | Not | Not | >99 |
| Comparative example 11 | 50 | 3 | 0.06 | 500/10 | 6 | Not | Not | >99 |
| Comparative example 12 | 50 | 3 | 0.06 | 500/10 | 12 | Not | Not | >99 |
| Comparative example 4 | 50 | 3 | 0.06 | 400/10 | 10 | Existence | Existence | 0 |
| Comparative example 5 | 50 | 3 | 0.06 | 500/10 | 5 | Not | Existence | 60-80 |

Although the method of detoxifying asbestos by using a room-temperature recrystallization scheme has been described in detail, it is obvious that various variations and modifications are possible without departing from the scope of the present invention.

As described above, although various examples have been illustrated and described, the present disclosure is not limited to the above-mentioned examples and various modifications can be made by those skilled in the art without departing from the scope of the appended claims. In addition, these modified examples should not be appreciated separately from technical spirits or prospects.

Therefore, it should be understood that the present invention is not limited to the embodiments described above. The scope of the present invention will be limited by the appended claims. In addition, it will also be apparent to those skilled in the art that variations or modifications from the appended claims and the equivalent concept of the claims are included in the scope of the present invention.

What is claimed is:

1. A method of detoxifying asbestos by using a room-temperature recrystallization scheme, the method consists of:
   heat-treating a rock or slate containing asbestos; and
   putting the heat-treated rock or slate in an aqueous solution, to which organic acid is added, to allow the heat-treated rock or slate to react with the aqueous solution having the organic acid.

2. The method of claim 1, wherein the rock containing asbestos includes serpentine.

3. The method of claim 1, wherein the heat treatment is performed at a temperature in a range of 500° C. to 600° C.

4. The method of claim 1, wherein the heat treatment is performed for 5 hours to 15 hours.

5. The method of claim 1, wherein the organic acid is oxalic acid.

6. The method of claim 1, wherein the reaction is performed at a room temperature and a normal pressure.

7. The method of claim 1, wherein the reaction is performed for 6 hours to 12 hours.

8. A method of detoxifying asbestos by using a room-temperature recrystallization scheme, the method comprising:
   heat-treating a rock or slate containing asbestos; and
   putting the heat-treated rock or slate in aqueous solution, to which organic acid is added, to allow the heat-treated rock or slate to react with the aqueous solution having the organic acid,
   wherein the organic acid is added to the aqueous solution at a weight ratio of 0.0125 to 0.06 with respect to the rock or the slate containing asbestos.

9. The method of claim 8, wherein the rock containing asbestos includes serpentine.

10. The method of claim 8, wherein the heat treatment is performed at a temperature in a range of 500° C. to 600° C.

11. The method of claim 8, wherein the heat treatment is performed for 5 hours to 15 hours.

12. The method of claim 8, wherein the organic acid is oxalic acid.

13. The method of claim 8, wherein the reaction is performed at a room temperature and a normal pressure.

14. The method of claim 8, wherein the reaction is performed for 6 hours to 12 hours.

* * * * *